United States Patent

Raser

[15] 3,696,397

[45] Oct. 3, 1972

[54] GRAPH-READING DIGITAL CONVERTER

[72] Inventor: William H. Raser, 6451 W. 83rd St., Los Angeles, Calif. 90045

[22] Filed: March 16, 1970

[21] Appl. No.: 19,712

[52] U.S. Cl. ................340/347 AD, 33/1 M, 178/18, 235/61.6 A

[51] Int. Cl. ........G01c 7/04, G08c 9/00, H03k 13/02

[58] Field of Search ..............340/347; 33/1, 125, 94; 235/61.115; 346/2; 178/18–20

[56] References Cited

UNITED STATES PATENTS

| | | | |
|---|---|---|---|
| 2,517,264 | 8/1950 | Wake | 33/94 |
| 3,253,273 | 5/1966 | Allen et al. | 340/347 AD |
| 3,286,251 | 11/1966 | Byun et al. | 340/347 AD |
| 3,500,379 | 3/1970 | Gibbons et al. | 178/18 X |
| 3,346,724 | 10/1967 | Fuhrmeister et al. | 340/347 AD X |
| 3,335,287 | 8/1967 | Hargens | 235/61.11 E UX |
| 3,030,617 | 4/1962 | Chase | 340/347 P |
| 3,184,847 | 5/1965 | Rosen | 33/1 M |

OTHER PUBLICATIONS

Susskind, " Notes on A–D Conversion Techniques," Technology Press, MIT, 1957

*Primary Examiner*—Maynard R. Wilbur
*Assistant Examiner*—Thomas J. Sloyan
*Attorney*—Henry M. Bissell

[57] ABSTRACT

An analog-to-digital data conversion system for digitizing points and lines appearing on graphs and charts. A portable instrument rolls freely over any marked surface, is directed to a succession of points, and records coordinates on tape for computer usage. Any such usage generally requires a tape reading program involving several steps or subprograms. If a relatively simple trigonometric coordinate transformation subprogram is added to this program, the tracing instrument can be kept simple and inexpensive by operating in semi-polar rather than in the final rectangular coordinates.

13 Claims, 10 Drawing Figures

INVENTOR.
WILLIAM H. RASER

INVENTOR
WILLIAM H. RASER

INVENTOR.
WILLIAM H. RASER

INVENTOR.
WILLIAM H. RASER

GRAPH-READING DIGITAL CONVERTER

This invention relates to computer peripheral equipment which converts paper-recorded analog data into digital form so that it can be read and processed by digital computers.

Scientific laboratories are a source of a variety of analog data which is recorded on paper in the form of a meaningful curved line. Examples of meaningful curved lines are oscillograms, electrocardiograms, seismograms, encephalograms, and, considering other sources, photographs and blueprints. The characteristic whereby all of these examples relate to the present invention is the tendency for all of the significant information which they portray to be associated with the rectangular coordinate values of certain prominent points along the curves. Sometimes, these prominent points are cyclic peaks. For example, if an oscillogram has been taken from the output of a strain gage mounted on structure which was being tested under vibratory loading, the information needed to predict fatigue life of the specimen of structure would be available from the coordinates of the peaks of the recorded line. In this case, a computer is useful to make this prediction.

In other words, the specific form of the invention illustrated in the figures and described in detail hereinafter comprises an apparatus for graphical data analysis. Reading of data is done by operating the apparatus in a curve-tracing or point-jumping manner, by closing a switch each time a desired point is reached, and by programming a computer to accept and analyze the data. An alternate procedure is to employ an automatic timing device which digitizes (reads) at regular intervals of time. Either way, the apparatus rolls over the paper as the data is taken.

In general, the overall object of the present invention is to provide apparatus for assisting a person to select points on a graph, to measure distances from these points to some convenient coordinate system, and to introduce these measurements into a computer in a rapid and convenient manner.

Prior art digitizing equipment has certain disadvantages. One is the complexity of framework structure which causes unnecessary manufacturing expense. Other disadvantages relate to view obstructions and other difficulties encountered when the operator is seeking to read a point with maximum accuracy.

A primary object of this invention is to incorporate the mechanical simplicity of a pivoted radial arm and avoid the complexity of crossbars which move without rotation. Such crossbars seem to have an initial appeal because they may be constrained toward mutual perpendicularity and thereby function as perpendicular axes of a rectangular coordinate system. Although the use of rectangular coordinates (perpendicular axes) to define and express the position of each selected point is usually desirable, this does not mean that the original measurements should be made in terms of these coordinates since other measurements can be better accommodated or made with fewer parts. In this invention, the measurements are made in a hybrid (semi-polar) coordinate system and the results can be converted to rectangular (Cartesian) coordinates subsequently in a computer using trigonometric relationships.

A secondary object of this invention is to improve the utilization of the reflected light which shows the location of the line or point being digitized. In one form of this invention, this is an optical improvement which has a certain analogy to well known optical means for providing magnification.

It is a further object of the present invention to provide apparatus of the character referred to in the preceding object, adapted for use in a primary conversion step for converting recorded values of voltages, structural strain, body currents, acceleration, etc. given as a time graph, into a series of numbers punched onto tape or cards or otherwise recorded in a manner which can be read by a computer.

It is a further object of the present invention to provide novel apparatus of the character referred to above, in any or all of the various generic and/or specific aspects mentioned above, either individually or in any possible combination thereof.

It is a further object of the present invention to provide apparatus of the character referred to hereinbefore which is of relatively simple, inexpensive, rugged, easy-to-manufacture, easy-to-use construction, and which is adapted for very simple, quick and easy use in following a graphical record in the form of a curve.

Further objects are implicit in the detailed description which follows hereinafter (which is to be considered as exemplary of one form of the invention but not specifically limiting it thereto) and said objects will be apparent to persons skilled in the art after a careful study of the detailed description which follows hereinafter.

For the purpose of clarifying the nature of the present invention, one exemplary, but non-specifically-limiting, embodiment of the invention is illustrated in the hereinbelow described figures of the accompanying four sheets of drawings.

FIG. 1 is a perspective view illustrating one exemplary and non-specifically-limiting embodiment of the invention in operative position with respect to a drawing board, table, or the like, on which can be placed and clamped a graph such as the record of a time-varying load on a structure and which is to be effectively converted, insofar as a major primary step is concerned, by the apparatus of the present invention into a form readily processed by a computer. One of the components shown in this view is called an encoder and has a small portion broken away to illustrate a detail of some of its components. Another component is called a tracing head.

Figures 1, 7:
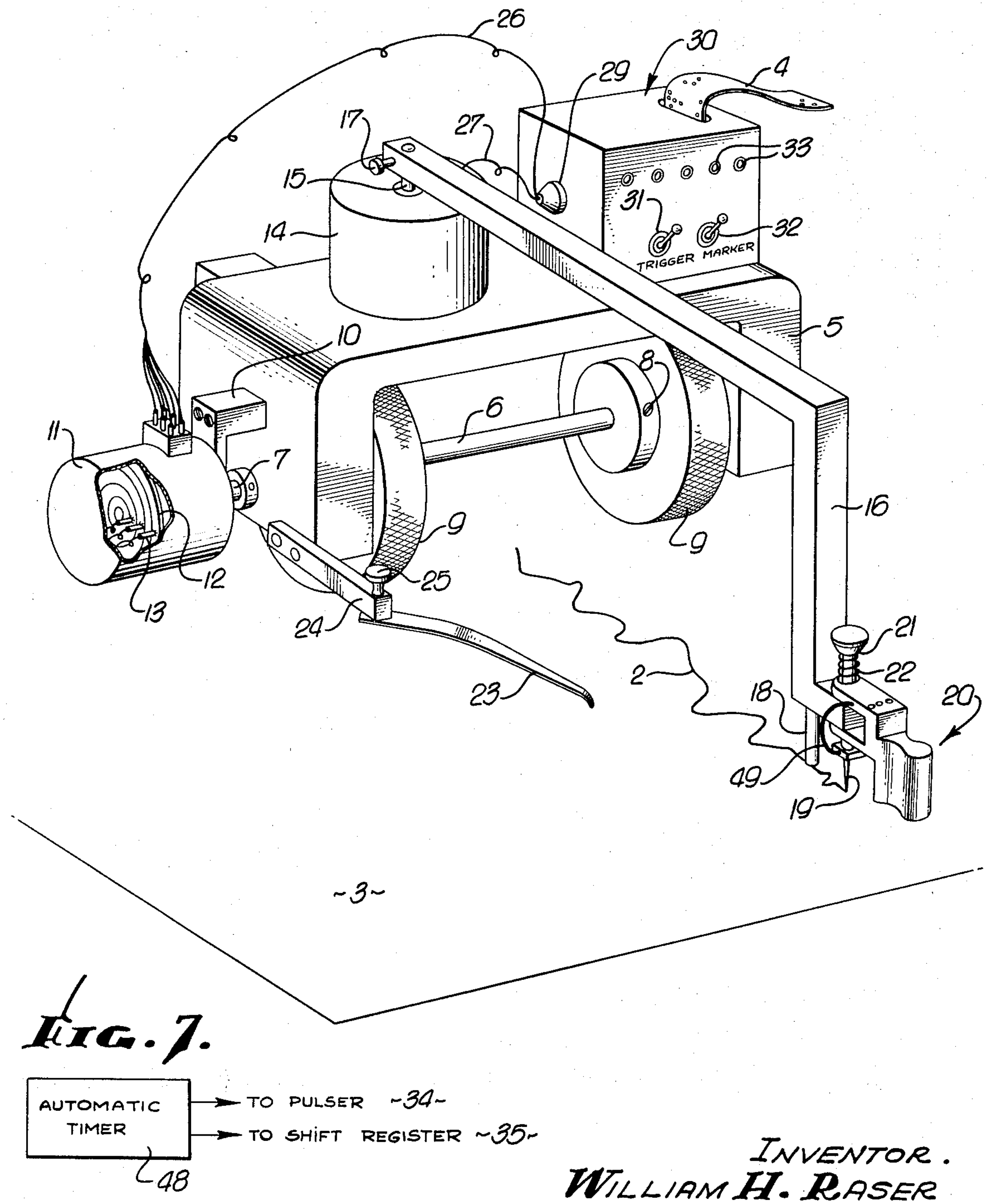
FIGS. 3 to 7 show the electronic circuits and groups of circuits which provide the output signals, that is, the voltages which determine the times when paper tape is to be punched.

In the exemplary, but non-specifically-limiting form of the invention illustrated in FIGS. 1 to 7, the variable function referred to above comprises a record in the form of a curve 2 carried by a chart or graph indicated generally at 3. Coordinate information from the curve is punched onto paper tape 4. The structural base of the apparatus is a main frame 5 which houses bearings to support an axle 6 and an axle extension or shaft 7. By means of screws 8, there are two wheels 9,9 which, together with the shaft extension 7 are rigidly attached to the axle. Held by means of a bracket 10 which is attached to frame 5, there is a type of shaft position transducer 11 into which shaft 7 projects.

In the exemplary form illustrated, the transducer 11 is a type known as an encoder. It contains an encoding disc 12 which is mounted on shaft 7 and a number of brushes 13 which are arranged along a radius of the encoding disc and which are mounted on the housing of the encoder 11. One side of the encoding disc is in contact with the brushes and this side presents to the brushes a combination of conducting and non-conducting surface material. The arrangement of conducting and non-conducting surface material can be as illustrated by the black and white areas, respectively, shown in FIG. 2. One of the brushes is arranged to contact all of the conducting material and each of the other brushes sweeps an annular ring area of the face of the disc. If the odd brush which contacts all of the conducting material on the disc is connected to an electrical ground, the other brushes are either electrically grounded or not grounded depending on the rotational position of the disc and the pattern of the conducting material. In other words, electrically the encoder is equivalent to a switching arrangement whereby the brushes are grounded or not grounded as a function of the rotation angle of the disc. If the condition of grounding of any brush is considered to represent the mathematical symbol "1", and if the condition of not grounding represents the symbol "0", then the electrical condition of the brush can be considered a count of the number of 11¼-degree units of rotation angle, with the count being in binary arithmetic. If more rings and more brushes are used in such an arrangement, the count becomes greater and the resolution becomes finer.

A second transducer or shaft position encoder 14 is mounted on top of frame 5 with its shaft 15 pointing in a vertical direction. A tracing arm 16 is attached rigidly to this shaft 15 by means of a set screw 17. A drag pin 18 is mounted on arm 16 and is in a position to contact the chart 3. In normal operation, the apparatus rests on the chart 3 with three points of contact, namely the two wheels 9 and the drag pin 18.

Also mounted on arm 16 are a stylus or tracing point 19, a head or handle 20 and a combination of nut 21 and spring 22 arranged to permit the operator to force the point of stylus 19 down to contact the paper if he should so desire.

In the exemplary but non-specifically-limiting form of the invention illustrated, manual line-following displacement of the stylus in the plane of the chart 3 causes certain angular displacements or rotations of the shafts 7 and 15. Usually, the apparatus will be placed on the chart in such a manner that the longitudinal or X axis of the chart corresponds to rolling of the wheels on shafts 6 and 7 while transverse or Y axis displacement of the stylus causes rotation primarily in shaft 15. If the maximum transverse stylus displacement were very small and the length of arm 16 were very large, the previously mentioned shaft rotations would be approximately independent and separate functions of the X and Y displacements of the stylus. However, in a practical application of the type shown in the illustrations, a trigonometric interrelationship occurs.

To illustrate this relationship, let A equal tracing arm rotation angle measured in radians; B equal to axle rotation measured in radians; L equal tracing arm length; D equal wheel diameter; X equal longitudinal displacement of tracing point; and Y equal lateral displacement of tracing point. Then the rectangular coordinates of the traced point are given by the following equations:

$$Y = L \sin(A)$$

$$X = \tfrac{1}{2} DB - L(1 - \cos A)$$

In the exemplary form of the invention illustrated, no effort is made to introduce the above trigonometric relationship since the tape 4 is read by a computer and the computer programmer can arrange for the correction of this to be made by the computer. In other words, the computer will solve for X and Y in a manner which is well known in computer technology.

In some applications, additional computation inside the computer will be required if the orientation of the apparatus on the chart is not such as to cause rolling of the axle 6 to accompany a displacement of the stylus along an exact longitudinal axis of the chart with no transverse-axis displacement. Therefore, in some applications, it will be desirable to orient the apparatus along the longitudinal direction. This can be done by trial and error as long as a convenient checking of orientation is provided. In FIG. 1, a pointer 23 is provided to accomplish this checking. It is mounted on a bracket 24 by means of a thumbscrew 25. If the chart 3 is a piece of graph paper with grid lines, parallel orientation will be indicated if the operator can find a position of pointer 23 and a grid line on the paper which coincide for two or more rolling positions of the apparatus.

Figure 3:
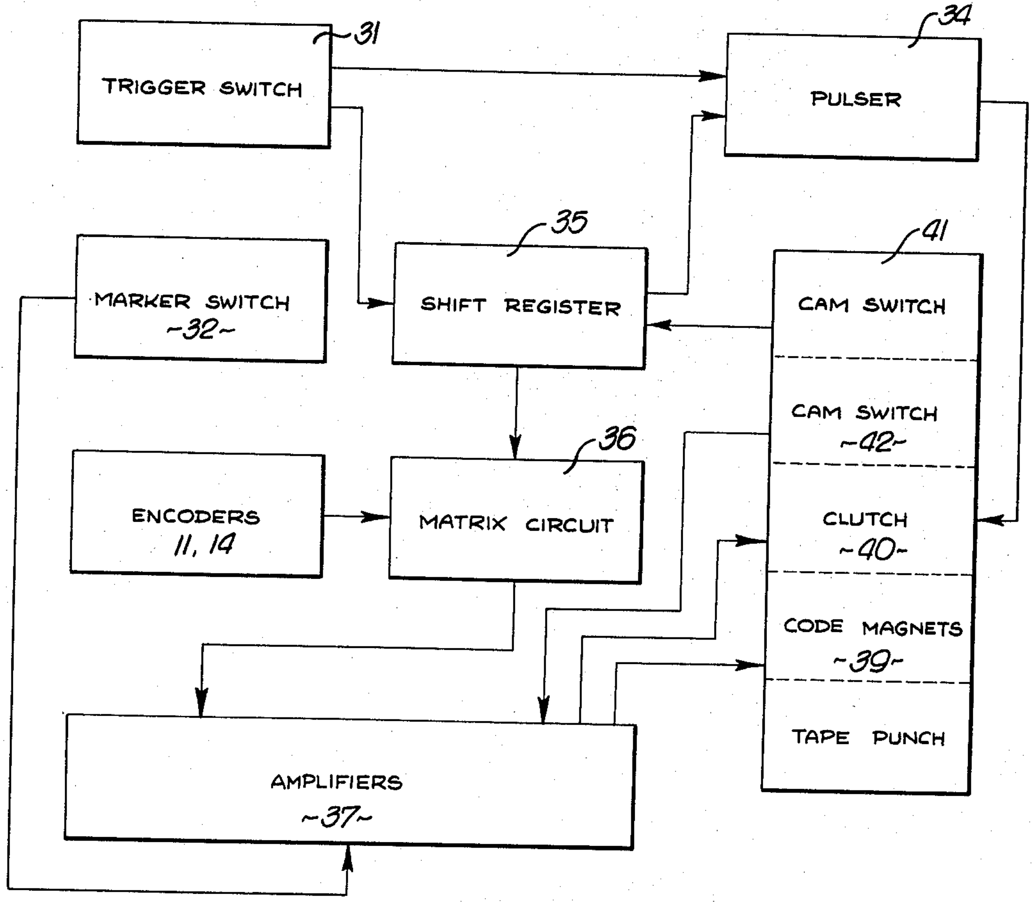

Cables 26 and 27 and connectors like 29 are used to connect the brushes of encoders 11 and 14 to the rest of the electrical system inside housing 30. Housing 30 provides room for the paper tape punch and its electrical control circuit. This housing also provides a space for mounting a switch 31 called a trigger switch, and a switch 32 called a marker switch. Indicator lights 33 can be displayed on the front of housing 30. As illustrated in FIG. 3, the electrical or electronic control system for the punch can be considered to be composed of four units, a pulser 34, a shift register 35, a matrix circuit 36 and a number of amplifiers 37. The signal connections required between these four units, the switches, the encoders and parts of the tape punch are shown in FIG. 3. These units can be composed of nothing more than resistances, diodes, capacitors, amplifiers, switches, and power supplies. Except for power supplies, these are illustrated in FIG. 4.

Figure 2:
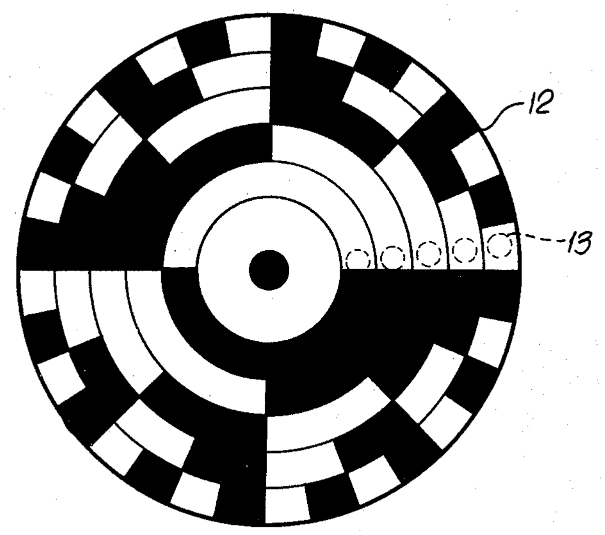
FIG. 2 is a larger scale view of two of the components inside the encoders shown in FIG. 1.
Figure 4:
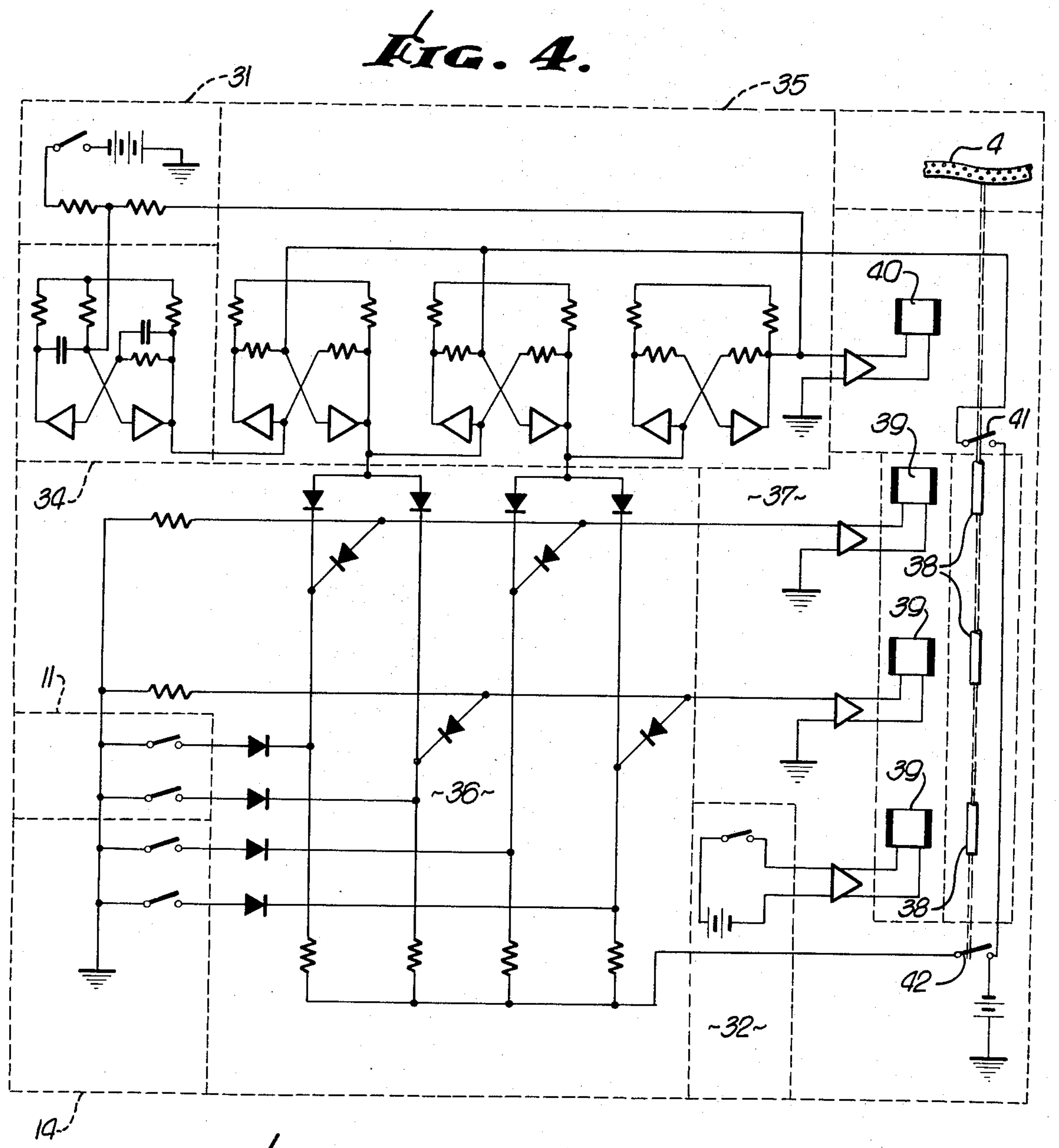

In the same way that FIG. 2 shows an encoder disc which is arranged to have a smaller count and therefore less accuracy than would normally be expected of such a system, FIG. 4 represents exaggeration of simplicity for the purpose of illustrating only the important features of the electrical components. Dashed lines in FIG. 4 are used to represent the boundaries of the units in FIG. 3. Within each zone, the number is given corresponding to the elements in FIG. 3. The double dashed line in FIG. 4 represents a mechanical connection or a mechanical inter-relationship between parts of the paper tape punch.

The mechanical elements of a paper tape punch are well known by those experienced in the art. Since there is nothing novel about the design and the use of the mechanical elements of the paper tape punch, only those elements will be touched upon that relate closely to the electrical system. These elements include a set of punching rods 38 which are made of hardened steel and which are arranged for perforating holes in paper tape 4. Each rod is associated with a solenoid 39 which controls its position in the punching cycle. The punching cycle is initiated by another solenoid 40 and is accompanied by mechanical motion which operates switches 41 and 42.

FIG. 4 shows the basic nature of the electrical units identified in FIG. 3. The pulser 34 is seen to be a monostable multivibrator. Its main purpose is to receive a signal from trigger switch 31 and transmit a pulse of a particular wave form. However, it can do this only when a certain condition exists in the shift register 35.

The shift register consists of several bistable multivibrators. The shift register functions somewhat like a ring counter or a linear sequence counter in that a certain condition of each multivibrator is achieved in only one of the several multivibrators at one time. Each time the shift register is given a pulse, sometimes called a "-clock signal," from switch 41, this condition jumps from the one multivibrator to the next in sequence. When this condition arrives at the last multivibrator in the series, it represents completion of the punch cycle and enables the trigger switch to cause the pulser to repeat the cycle. The purpose of the shift register 35 and the matrix circuit 36 has to do with the fact that there are usually more signals presented by the encoders than can be punched at any one instant of time on the paper tape. Therefore these two components serve to control the necessary scanning of all of the many encoder brush connections (in contrast to only four, i.e., two brush connections per encoder shown in FIG. 4) that is required by a punch that can usually handle only 5, 6, 7 or 8 binary signals at one time. The paper tape represents binary arithmetic because a punched hole may represent a "one" and an absence of a punched hole may represent a "zero."

All diodes of the matrix circuit 36 which are connected to encoders 11 and 14 and to the shift register 35 form what is known in digital computer terminology as "AND gates" and all diagonally-arrayed diodes, "OR gates." These words are quite appropriate if the matrix circuit 36 is regarded as a circuit which passes along a certain signal if such a signal is both generated in the encoder and enabled to be transmitted by a proper signal in the shift register; a signal is present at the output if an appropriate signal is present at either the first AND gate or the second AND gate, etc. The remainder of the circuit of FIG. 4 consists of a group of amplifiers 37 and the switches and solenoids in the punch. The switches 41 and 42 synchronize the punch cycle.

Figure 5:
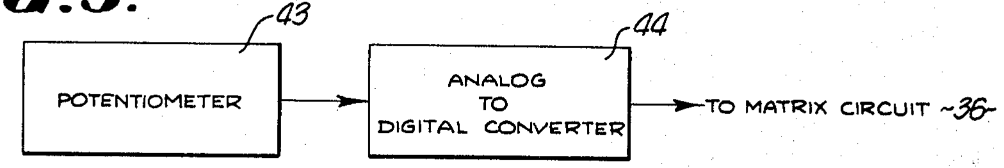
Figure 6:
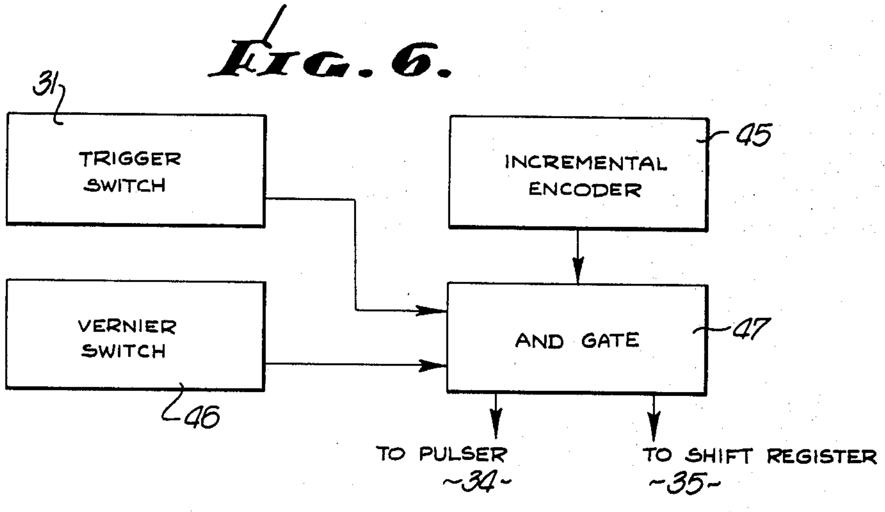

FIGS. 5, 6 and 7 introduce extensions and variations of the foregoing example. FIG. 5 represents a replacement for the encoder. One disadvantage of the brush-type encoder is the friction imposed by the contact pressure of all of the brushes. Since a potentiometer 43 has only one brush or wiper, the combination of it and a special analog-to-digital conversion circuit 44 reduces the friction.

FIG. 6 represents a resolution-reducing replacement for the trigger switch 31 in FIG. 3. As has been pointed out, the use of many brushes in the encoder with attendant increase of complexity in the matrix circuit 36 and elsewhere can provide high-count capability and good accuracy. FIG. 6 represents a method of obtaining greater accuracy for a given size encoder. It operates in a manner somewhat analogous to the well known vernier scale on a micrometer; that is, it adds a means of interpolating between counts. It does this by adding a second encoder 45 onto each existing encoder shaft. The second encoder is merely an incremental encoder, i.e. it merely produces pulses at a uniform rate with respect to shaft rotation. A third switch, called a vernier switch 46 is placed beside switches 31 and 32 so that this vernier can be optional and used only for some of the more important points on the curve 2. Then, when the vernier switch is on, an AND gate 47 enables the pulser 34 to trigger the punch cycle with each pulse from the incremental encoder 45. The effect on the tape is that of repetition of one point a certain number of times. The computer that reads the tape is then programmed to provide the proper interpretation of repeated coordinates. Although this vernier feature uses up paper tape faster, it is still an economical way of obtaining extra accuracy, particularly if employed only when needed.

FIG. 7 also represents a replacement for the trigger switch 31. Although the trigger switch may be a non-moving footswitch instead of being mounted as shown in FIG. 1, an operator could prefer not to be required to push a switch once for each point digitized. Therefore, a constant-interval pulse-generating automatic timer 48 is more convenient in some cases. In such cases, the marker switch could be a foot-operated switch. The main use of the marker switch is to indicate the beginning of a new series of points to be read.

Figure 9:
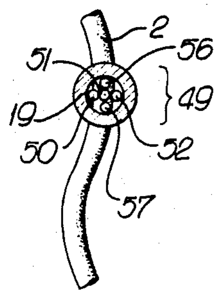
FIGS. 8 to 10 show details of a tracing head similar to the one included in FIG. 1.
Figure 8:
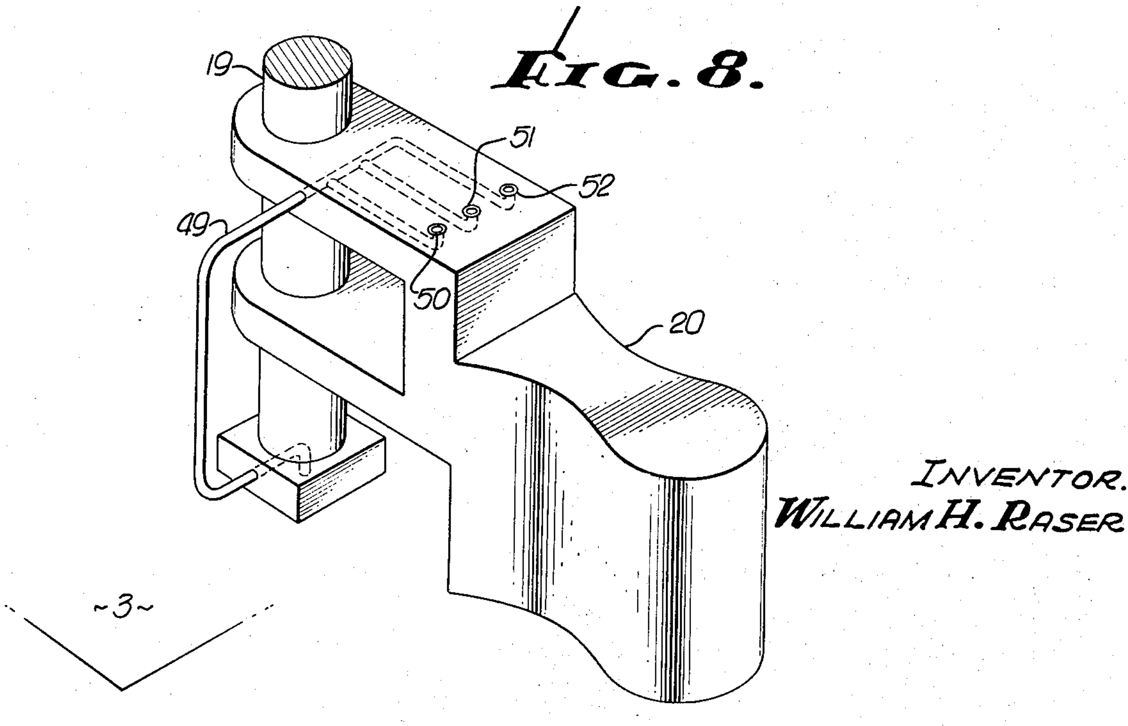
Figure 10:
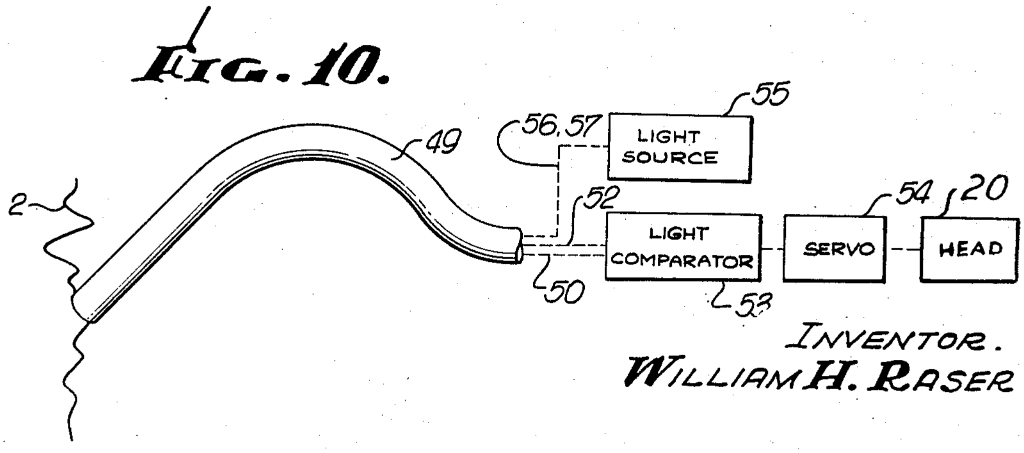

FIGS. 8, 9 and 10 relate to the head 20 of the tracing arm 16 and to means for making it easier for the operator to digitize many points accurately without eyestrain. This means employs a bundle of optical fibers 49.

Thin glass fibers transmit light along their length and each fiber in a bundle does this with relatively small loss of light intensity. Bundles of such fibers are commonly used to transmit a light pattern which either reproduces an original image or performs whatever image distortion a deliberate rearrangement of fibers will produce. One type of distortion is accomplished by assembly of optical fibers so that they branch out from a single bundle at one end. In this invention, the light fibers branch out at the upper end, assuming upper refers to greater height above the graph 3.

In FIG. 8, the tip of the tracing point 19 is hollow and contains a fiberoptic bundle. At this lower end, the bundle appears to have a generally circular section; however, the actual fiber-composed cross-section is that of five circles inscribed in the circle representing the jacket of the bundle 49. Alternative forms of this invention may have less than five fiber groupings.

FIG. 9 shows an enlarged sectional view of the tracing point tip 19 looking downward onto the given curve 2. Inside the hollow tracing point tip are five circular fiber groups, all of which are arranged to from a cross. The three fiber groups 50, 51, 52 that form a line which is generally transverse to the direction of the curve 2 are intended to carry light upward away from the curve and one or both of the other two, 56, 57 of the five fiber groups can be connected to a bright source of illumination. If illumination is used, if only one of the two illumination-carrying fiber groups is illuminated, and if a means is provided for switching this illumination back and forth between the two as desired, the operator is given an option of choosing between two optical displays that are slightly different with respect to longitudinal displacement along the curve 2. In manual line following, this option has limited advantages; however, it can introduce useful features in combination with automatic scanning of the fiberoptic display 50, 51, 52, such as reducing the danger of losing line contact.

The fiberoptic display 50, 51, 52 consists of the exposed upper ends of the branches of the bundle 49 which form the left, center and right hand groups of fibers shown in FIG. 9, respectively. Depending on the width of the line to be followed and whether line edge following or line straddling is chosen by the operator, either two or all three of the displays are watched by the operator in his attempt to follow the curve 2 accurately. For example, if line straddling is chosen, he may want to guide the head 20 so that equal intensity is observed between displays 50 and 52.

The advantages of fiberoptic displays multiply when their use is compounded with other features. Light intensification equipment is now available to enhance the differences among the various displays. Spreading of the distances between displays 50, 51 and 52 is a form of magnification of the original image. Light comparators and servomechanisms are also available to automate the line following process as shown in FIG. 10. In all of these cases, additional advantages result from the use of fiber optics in line following digitizers.

Referring to FIG. 10 wherein the optical bundle 49 and a servomechanism 54 are shown in combination, one of the display-producing fiber groups, namely, the centrally located fiber group 51 is not used in this combination. One or two fiber groups 56, 57 are used to bring in light from a light source 55 and the remaining two fiber groups 50, 52 of the bundle transmit light from the given line 2 to a light comparator 53. The light comparator produces an electrical signal which is proportional to the deviation of the center of the lower end of the optic bundle 49 from an edge of line 2. For a particular choice of which of the two edges of the given line are chosen, i.e., for the case where the right hand edge of the line in FIG. 9 has been chosen for automatic line following, perfect centering of the bundle over the line edge causes fiber group 52 to be exposed to maximum intensity of reflected light due to its termination over white paper and fiber group 50 to be exposed to minimum intensity due to its termination over a part of the black line 2. In general, the diameter of each fiber group is small compared to the thickness of the given line. Therefore, for this selection of line edge, the effects of some other deviations of the digitizing head 20 are as follows:

| Deviation | Light Intensity of Two Fiber Groups | | | |
|---|---|---|---|---|
| from Edge | Group 52 | Group 50 | Their Average | Their Difference |
| Large, toward line center | Minimum | Minimum or above | Low | Small |
| Small, toward line center | Near Maximum | Minimum | Below Medium | Near Maximum |
| Small, away from center | Maximum | Above Minimum | Above Medium | Near Maximum |
| Large, away from center | Maximum | Near Maximum | High | Small |

The main purpose of the light comparator 53 is to compare the average intensity of light in fiber groups 50 and 52 with the medium value of this average corresponding to the case of zero deviation of the head 20. In doing this, the light comparator generates a voltage or other form of electrical signal proportional to the change in the average. For small deviations in one direction, such a voltage would be positive; for small errors in the other direction, such a voltage would be negative. This voltage is transmitted to a position-type servomechanism 54 which drives the tracing head 20. Zero error voltage to this servo would produce no change in the position of the head 20 relative to frame 5.

A second purpose of the light comparator is to signal that a large difference in light intensity exists between fiber groups 50 and 52. This signal verifies that no large error exists; absence of this verification signal means that the head is out of range and the line is lost or is being lost. In some cases, when loss of verifying signal is quickly converted into a shift of connection with light source 55 from the advancing fiber group 57 to the retreating fiber group 56, loss of contact with the line can be prevented. The danger of losing the line can come from line gaps, line faintness, or even sharp changes in direction.

To provide the required electrical error quantity and verifying signal, the light comparator 53 consists of two photoelectric circuits, both of which are well known to those skilled in the art. Likewise, the details of position servomechanisms and light sources are well known to those skilled in the art.

I claim:

1. Apparatus for digitizing graphically represented data or the like comprising:

a frame mounted for translational movement on wheel means in a selected direction along a surface graph to provide a measure of one coordinate of the graph;

a stylus attached to a pivot on the frame for rotational movement about an axis generally orthogonal to the direction of translational movement, which pivot is movable with said frame, the stylus being intended to follow a line or curve of the surface graph in operation; and separate digitizing transducers respectively coupled to the wheel means and to the stylus for providing discrete electrical digital signals indicative of the travel of the frame in said selected direction and the degree of rotation of said stylus about said axis respectively.

2. Apparatus in accordance with claim 1 further including means mounted on said frame for accurately driving the transducer connected thereto through frictional engagement with said surface graph.

3. Apparatus in accordance with claim 2 wherein said frame mounted means comprises a pair of rotatable wheels having a frictional surface to support said frame for translational movement by rolling without slippage over said graph surface.

4. Apparatus in accordance with claim 1 wherein said frame may be positioned on said surface graph for movement of the entire apparatus in any direction parallel to said surface graph.

5. Apparatus in accordance with claim 1 further including a mechanism coupled to said transducers for recording said electrical signals at selected points during the traversal of said graph.

6. Apparatus as claimed in claim 1 comprising:

a frame;

an axle rotatably mounted under said frame, said axle containing two rigidly mounted wheels having a frictional surface which can roll without slippage over a flat surface on which graphic data is presented;

a stylus pivotably mounted to the frame for angular movement about an axis orthogonal to the direction of travel of the frame over the surface;

first means coupled to the axle for measuring and recording digitally the angular rotation of the axle as an indication of distance which the frame has moved as a result of the rolling of said wheels over a flat surface;

second means for measuring and recording digitally the angle of the stylus relative to the said frame; and electrical means for controlling a recording sequence associated with said first and second means, whereby the apparatus as a whole moves over the flat surface on which the graphical data is presented.

7. Apparatus in accordance with claim 6 further including:

light transmitting means connected to the stylus for enhancing the curve following capability thereof, which light transmitting means comprises:

first and second groups of light transmitting fibers with their upper ends exposed to light, and third, fourth and fifth groups of light transmitting fibers with their upper ends serving as light indicators, said five groups being transversely cut and exposed at their lower end where they form a selected cross-sectional pattern, such pattern resembling a cross with the first and second groups being generally aligned parallel to the movement of said frame, with the third and fifth groups forming a line that is generally perpendicular to the movement of said frame, and with the fourth group being centrally located relative to the other four groups, said five groups tending to indicate relative levels of intensity of reflected light at three points on a line transverse to the direction of movement of said frame so as to facilitate the selective positioning of the stylus relative to said area of interest.

8. Apparatus in accordance with claim 7 wherein the exposure to light of the fibers in said first and second groups is transferable from one group to the other in order to avoid loss of contact with the line being followed.

9. Apparatus in accordance with claim 6 further including:

a sighting member adjustably affixed to said frame for sighting along a reference mark on said graph to determine the direction of translational movement of said apparatus relative to said mark.

10. Apparatus in accordance with claim 6 wherein:

the first means comprises a first shaft angle encoder coupled to the axle for obtaining binary electrical counts which measure the rotation of the wheels with respect to the frame; and the second means comprises a second shaft angle encoder for obtaining binary electrical counts which measure the angular position of the stylus relative to the frame.

11. Apparatus in accordance with claim 10 further comprising:

a third shaft angle encoder coupled to rotate with a selected one of the first and second shaft angle encoders for providing incremental pulses in a form representing a coded interpolation count between two different position signals of the associated one of said first and second encoders.

12. Apparatus as claimed in claim 6 including:

a first switching-type shaft position encoder which converts the rolling displacement of said frame into digital electrical signals;

a second such encoder which converts the angular position of said stylus relative to said frame into additional digital signals;

means for scanning, amplifying and tape recording the signals from said encoders;

a sheath to enclose lengths of glass fibers extending from the vicinity of a small area on a flat surface on which said frame rolls to a raised location which may be near the top of said stylus or of structure mounted hereby;

a first and second group of glass fibers with their upper ends controllably exposed to light, and a third, fourth, and fifth group of glass fibers with their upper ends serving as light indicators, said five groups being transversely cut and exposed by said sheath at their lower end where they form a certain cross-sectional pattern, this pattern resembling a cross with the first and second said groups being generally aligned parallel to the movement of said frame, with the third and fifth said groups forming a line that is generally perpendicular to the movement of said frame, and with the fourth said group being located at the center of a circle formed by the other four said groups, said five groups, when positioned over an area containing a line or a dark spot on paper, tending to indicate relative levels of intensity of reflected light at three points on a line transverse to the direction of movement of said frame so that they facilitate the automatic positioning of said stylus relative to the center or edge of a given line.

13. Apparatus for digitally recording the numerical values of an arc sine function of one of the coordinates and a multi-term function of the other coordinate in a one-linear-coordinate-plus-one-polar-coordinate reference system of a horizontally-movable position of a stylus, comprising:

a frame;

an axle rotatably mounted under said frame, said axle containing two rigidly mounted knurled-rim wheels which can roll without slippage over a flat surface on which graphic data is mounted;

a stylus on an arm which is pivotable about a vertical axis on said frame;

two brush-contacting, pattern-conducting encoding discs driven by relative motions between said frame and one each of said axle and said stylus;

a flip-flop shift register for producing a scanning sequence;

a diode matrix of AND gates to effect scanning;

OR gates to combine signals so that each flip-flop of said each shift register enables transmission of only a fraction of the total number of bits on said discs; switching means operable to set the first flip-flop of said shift register and reset the others at the beginning of each encoding disc scanning and recording operation;

a pulse amplifier triggered by a step from the first flip-flop of said shift register;

a motorized clutch-operated paper tape punch in which a clutch coil is operated by said pulse amplifier;

cam switches within said punch to provide clocking pulses to said shift register and to reinforce cut-off signals from said amplifying gates;

code magnets operable by signals from said amplifying gates so that one hole is punched in paper tape each time one of the brushes in contact with said encoder discs is in contact with a metallic surface during a clutch-operated punching cycle;

a means for additional marking of tape; and an array of light-conducting fibers mounted for movement with the stylus and comprising a first set for directing light to an area of interest and a second set for transmitting light reflected from the area of interest to a remote indicator for use in selectively positioning the stylus relative to said area of interest.

* * * * *